Jan. 24, 1967 D. L. KNAUSS 3,300,710

VOLTAGE REFERENCE CIRCUIT WITH LOW INCREMENTAL IMPEDANCE AND LOW TEMPERATURE COEFFICIENT

Filed Jan. 23, 1963

INVENTOR.
DALTON L. KNAUSS

BY John J. McLaughlin

ATTORNEY

3,300,710
VOLTAGE REFERENCE CIRCUIT WITH LOW INCREMENTAL IMPEDANCE AND LOW TEMPERATURE COEFFICIENT

Dalton L. Knauss, 248 S. Wells Fargo Ave., Scottsdale, Ariz. 85251
Filed Jan. 23, 1963, Ser. No. 253,478
3 Claims. (Cl. 323—17)

My invention relates to an improved voltage regulating system employing semiconductor and the like elements, and having the characteristics of low to zero temperature coefficient, and low to zero incremental impedance.

Because of known limitations of voltage regulating circuits employing voltage regulator tubes, semiconductor diodes have come into use in voltage regulating circuits. Semiconductor diodes normally exhibit positive incremental impedance characteristics in their breakdown (Zener) regions, however, and normally also exhibit a positive temperature coefficient. Perfect voltage regulation is not attained under such circumstances. By the use of a semiconductor device having zero incremental impedance as well as zero temperature coefficient, essentially perfect voltage regulation can be realized even under such varying ambient temperature conditions such as found in spacecraft, for example.

The principal object of my present invention is the provision of improved voltage regulating means having low to zero incremental impedance and low to zero temperature coefficient.

Another object is the provision of an improved accurate voltage regulating circuit employing a semiconductor diode as the principal regulating element.

A still further object is to employ in a voltage regulating circuit, a semiconductor device compensated to produce a circuit having substantially zero incremental impedance and substantially zero temperature coefficient, and providing essentially perfect voltage regulation under a wide range of ambient conditions.

Other specific objects and features of the invention will be apparent from the following detailed description taken with the accompanying drawings, wherein.

Figure 4:
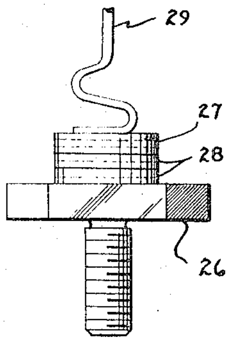
FIG. 4 is a unit similar to FIG. 1, but showing a modification in the semiconductor elements employed.
Figure 7:
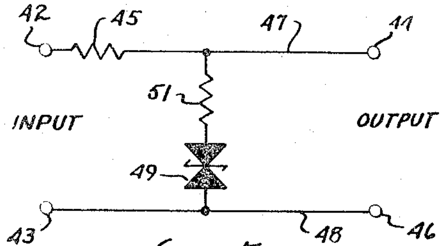
Figure 8:
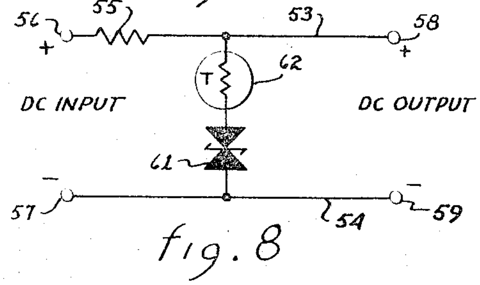
Figure 6:
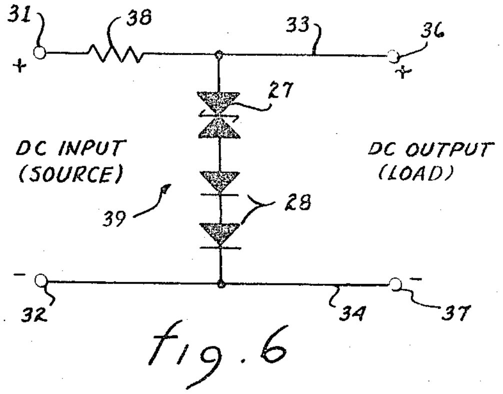

FIG. 6 is a simple diagram showing a voltage regulating circuit employing the unit shown in FIG. 4 to provide substantially zero incremental impedance and substantially zero temperature coefficient; and FIGS. 7 and 8 show similar circuits employing other combinations of the clipper diode having negative temperature coefficient and negative impedance in combination with a wire wound resistance and thermistor.

Figure 1:
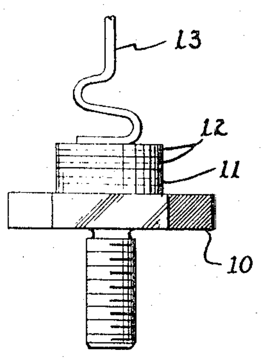
FIG. 1 is an elevational view enlarged and in part schematic showing one form of semiconductor unit which may be employed as part of the circuit of the present invention.

In FIG. 1, I show illustratively a standard heat-sink type of base 10 to which is secured a clipper type diode 11 and a pair of zener type diodes 12. The clipper 11 has negative incremental impedance, as will be explained, as well as a negative temperature coefficient. The zener diodes are selected to effectively offset the negative impedance characteristic and the negative temperature coefficient of the clipper type diode so that the unit as a whole will have a very low to zero incremental impedance and a very low to zero temperature coefficient. As will be pointed out, the unit of FIG. 1 may form the semiconductor part of the circuit shown in FIG. 3. The unit is assembled in accordance with practices known in the industry such as, for example, by soldering the three semiconductor elements together and soldering them to the base 10. A lead-in electro of common type 13 is provided. In the drawing, I show no encapsulating glass, ceramic or metal envelope such as is commonly employed to enclose a semiconductor element. Those skilled in the art will understand that any encapsulating means known in the industry may be employed and applied in position by available suitable techniques.

Figure 2:
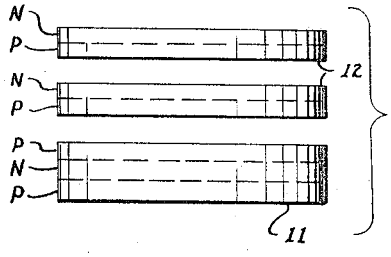
FIG. 2 is an enlarged, exploded view of the semiconductor elements employed as part of the unit shown in FIG. 1.

FIG. 2 shows the clipper type diode 11 used as a part of the FIG. 1 unit on a somewhat larger scale. As shown, it employs an intermediate n layer with p layers on opposite sides. The actual construction and method or production may follow practices common in producing transistors. It is generally known that transistors exhibit negative incremental impedance when operated in breakdown between emitter and collector when there is no electrical connection to the base region. In this particular embodiment, the p layers correspond to the emitter and collector portions of the transistor, and the intermediate n region corresponds to a transistor base. In order to obtain a clipper type diode 11 having negative incremental impedance in breakdown, it is essential that the n region analogous to the base in a transistor having a thickness dimension less than the minority carrier diffusion length in said region. As in the case of transistors, such a structure may be produced by many techniques. Actually, all techniques available for the production of transistors can be used to produce the clipper type diode 11. In actual practice, the base region n will be between one ten-thousandth to several thousandths of an inch in thickness, depending on the minority carrier diffusion length.

The clipper type diode 11 may either be non-symmetrical or symmetrical, and for my present purpose, a symmetrical configuration is suitable and may, in fact, at times have certain advantages. It is obvious, of course, that if the clipper is produced by first forming a doped crystal containing a donor impurity and an acceptor impurity diffused from both sides to produce the two p regions, an essentially electrically, symmetrical device will be obtained. When I refer to the clipper having a central n layer and two outside p layers, it should be kept in mind that the reverse of this arrangement may be employed, in which the dopes crystal is of the p type and donor impurities are diffused at both sides to form two exterior n regions.

Figure 3:
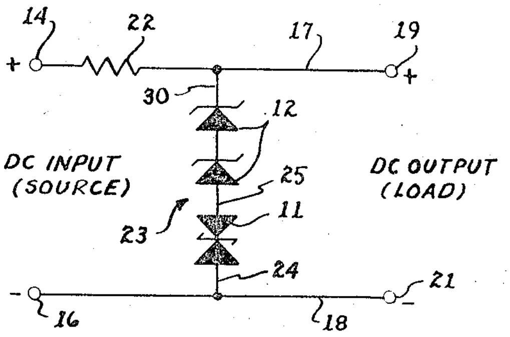
FIG. 3 is a circuit diagram in simple form showing the use of the unit of FIG. 1 employed as part of the voltage regulation circuit in such a manner as to provide zero incremental impedance and zero temperature coefficient.

FIG. 3 illustrates a circuit in which a pair of terminals 14 and 16 are connected to positive and negative sides respectively of a D.-C. input representing source voltage used in a circuit to be regulated. Conductors 17 and 18 lead to terminals 19 and 21 respectively which are adapted for connection to a load not shown, and they represent the output side of a voltage regulating circuit as illustrated in FIG. 3. It is the usual practice to ground one of the conductors 17 and 18, but the circuit shown does not illustrate this convention. A current limiting resistor 22 is inserted in the conductor 17, and the unit shown in FIG. 1 and indicated generally by the reference character 23 is connected across the two conductors 17 and 18. In the circuit, I shown the clipper type diode 11 inserted between points 24 and 25, and two zener type diodes 12 inserted between points 25 and 30.

I have already described that the clipper type diode 11 has negative incremental impedance characteristics and a negative temperature coefficient. Diodes 12 are, therefore, selected to cancel out, in effect, the negative impedance and negative temperature coefficient of the clipper type diode. By connecting them in series with each other and across the conductors 17 and 18 in parallel relation with the load, very accurate voltage control is obtainable. Those skilled in the art will understand that while the manner of producing a clipper type diode having negative impedance is well known in the art, it is also well known that a precise manner of controlling the value of such impedance is not available. Neither is it possible to predetermine the value of the temperature coefficient. The common experience is to find a relatively low value of negative impedance coupled with a positive temperature coefficient, but widely varying characteristics continued to be found. For this reason, it is possible to select clipper type diodes having almost any desirable combination of negative impedance and temperature coefficient value within perameters required by the present invention. It follows, therefore, that the element or elements offsetting the characteristics of the clipper type diode to produce substantially zero impedance and zero temperature coefficient may be varied rather extensively and selected from available commercial devices. While in general, more than one zener diode will be employed, the number is not fixed nor critical so long as it has the offsetting properties desired.

In accordance with one example, I selected a clipper type diode 11 having an impedance of −100 ohms (2 milliamperes) and a negative temperature coefficient of −14 mv./° C. In this case, I selected two diodes (Zener type) rated at 11 volts and each having a positive impedance of 50 ohms and a positive temperature coefficient of 7 mv./° C. at 2 milliamperes. By this means, I was able to obtain the combination of zero incremental impedance and zero temperautre coefficient to produce very, very accurate regulation with a circuit as shown in FIG. 3.

In FIG. 4, I employ a unit having a base 26, a clipper type diode 27, and a pair of forward connected or forward biased diodes 28. These are connected together to produce a unitary body because of the standard procedures in the industry as described in connection with FIG. 1. An upper terminal 29 is provided for connection of the unit into a circuit.

Figure 5:
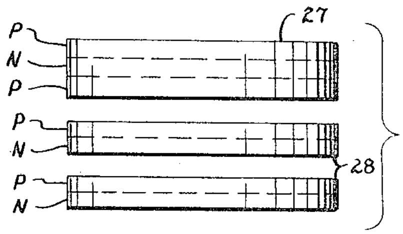
FIG. 5 is an exploded view showing the semiconductor elements employed in FIG. 4.

In FIG. 5, I indicate the polarities of the semiconductor elements in larger scale, and in FIG. 6, I show the utilization of the combination in a circuit in the same general manner as shown in FIG. 3.

In the circuit of FIG. 6, a pair of terminals 31 and 32 are provided to be connected to a source of voltage and conductors 33 and 34 lead to output terminals 36 and 37. A resistance 38 is connected into the conductor 33 and the unit shown in FIG. 4 identified generally by the reference character 39 may be connected between the two conductors 33 and 34. Thus, as in FIG. 3, the diode combination is in parallel with the load and, of course, the clipper diode 27 and forward connected diodes 28 are in series with each other. In the embodiment shown in FIGS. 4 through 6, the clipper type diode 27 is selected with an impedance of −50 ohms and a temperature coefficient of +4 mv./° C. Diodes 28 have a positive impedance of 25 ohms each and a temperature coefficient of −2 mv./ ° C. Thus, the unit 39 and the circuit shown in FIG. 6 exhibit substantially zero incremental impedance and zero temperature coefficient, making the unit 39 and a circuit as shown in FIG. 6 very valuable where precise voltage control is required.

Other elements than zener and forward connected diodes as shown in FIGS. 3 and 6, or combinations of them, may be employed to produce compensating functions required in accordance with the present invention to obtain low to zero incremental impedance and substantially zero temperautre coefficient. Two such possibilities are shown in FIGS. 7 and 8.

In FIG. 7, a pair of terminals 42 and 43 are adapted for connection to a D.-C. source and terminals 44 and 46 connected to a load to supply output direct current voltage thereto. The conductors 47 and 48 are in parallel relation as shown, and a clipper type diode 49 and electrical resistance 51 are in series with each other and in parallel relation to the terminals 44 and 46. By suitable selection, clipper type diodes and resistance 51, with or without other compensating elements, may be employed to obtain the zero characteristic of the previously described embodiments of the invention. This circuit may be used for either A.-C. or D.-C. voltage control.

In FIG. 8, the conductors 53 and 54 are provided with input terminals 56 and 57 and output terminals 58 and 59 respectively, the latter for connection to a load in the usual practice. A clipper type diode 61 and thermistor 62 are connected in series across the conductors 53 and 54 and in parallel relation to the load. Here also, by suitable selection, the required zero characteristics can be obtained. The invention is not limited by the details shown and described, but is defined by the claims.

I claim:

1. In a voltage regulating circuit:

(a) a clipper type semiconductor element with an intermediate thin layer of one conductivity type and two outside layers of opposite conductivity type, (b) said intermediate layer having a thickness dimension less than the minority carrier diffusion length in the region comprising said intermediate layer to thereby provide negative incremental impedance, (c) a positive incremental impedance element in series with said clipper type semiconductor element to substantially compensate at least in part for said negative incremental impedance, and (d) said semiconductor element and positive incremental impedance element having substantially compensating temperature coefficients.

2. A voltage regulating circuit as defined in claim 1, wherein said positive impedance element is a resistor.

3. In a voltage regulating circuit:

(a) a clipper type semiconductor element with an intermediate thin layer of one conductivity type and two outside layers of opposite conductivity type, (b) said intermediate layer having a thickness dimension less than the minority carrier diffusion length in the region comprising said intermediate layer to thereby provide negative incremental impedance, and (c) a positive incremental impedance element in series with said clipper type semiconductor element to substantially exactly compensate for said negative incremental impedance and form a voltage regulating circuit of substantially zero incremental impedance, said clipper type semiconductor element and positive impedance element having substantially compensating temperature coefficients.

References Cited by the Examiner

UNITED STATES PATENTS

| | | | |
|---|---|---|---|
| 2,908,871 | 10/1959 | McKay | 331—108 |
| 2,997,604 | 8/1961 | Shockley | 307—88.5 |
| 3,022,457 | 2/1962 | Doan | 323—22 |
| 3,089,998 | 5/1963 | Reuther | 323—22 |
| 3,184,972 | 5/1965 | Sikorski | 73—98 |

OTHER REFERENCES

Basic Theory and Application of Transistors, Department of the Army Technical Manual TM 11–690, 1959, page 99.

Anderson, R. L. Switching Device, IBM Technical Disclosure Bulletin, vol. 2, No. 3, October 1959, page 63.

JOHN F. COUCH, *Primary Examiner.*

RICHARD M. WOOD, *Examiner.*

K. D. MOORE, *Assistant Examiner.*